(12) United States Patent
Sobajima et al.

(10) Patent No.: US 10,661,888 B2
(45) Date of Patent: May 26, 2020

(54) DOLLY FOR HANDLING LANDING GEAR OF AIRCRAFT, AND METHOD FOR ATTACHING AND DETACHING LANDING GEAR USING THE SAME

(71) Applicant: MITSUBISHI AIRCRAFT CORPORATION, Aichi (JP)

(72) Inventors: Yuka Sobajima, Aichi (JP); Hideyuki Iwata, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 185 days.

(21) Appl. No.: 15/266,572

(22) Filed: Sep. 15, 2016

(65) Prior Publication Data

US 2017/0106972 A1  Apr. 20, 2017

(30) Foreign Application Priority Data

Oct. 19, 2015 (JP) .................. 2015-205422

(51) Int. Cl.
*B64C 25/20* (2006.01)
*B64F 5/50* (2017.01)
*B66C 23/48* (2006.01)

(52) U.S. Cl.
CPC ............. *B64C 25/20* (2013.01); *B64F 5/50* (2017.01); *B66C 23/48* (2013.01)

(58) Field of Classification Search
CPC .......... B64C 25/20; B64C 5/14; B66C 23/48; B66C 23/00; B66C 1/427; B66C 1/62;
(Continued)

(56) References Cited

U.S. PATENT DOCUMENTS 3,154,206 A   10/1964  Gillette, Jr. et al.
3,362,550 A *  1/1968  Kappler ................. B66C 13/18
                                            254/218
(Continued)

FOREIGN PATENT DOCUMENTS

CN    104401502 A    3/2015
DE     9318480 U1    3/1994
(Continued)

OTHER PUBLICATIONS

Extended European Search Report issued in Patent Application No. EP 16 18 8943 dated Mar. 10, 2017.
(Continued)

*Primary Examiner* — Tyrone V Hall, Jr.
*Assistant Examiner* — Abbie E Quann
(74) *Attorney, Agent, or Firm* — Pearne & Gordon LLP

(57) ABSTRACT

The present invention has an objective to provide a dolly for handling a landing gear of an aircraft that enables, while being downsized, work of positioning the landing gear with respect to an attachment portion of an airframe of the aircraft to be performed efficiently, and a method for attaching or detaching a landing gear using the dolly. A dolly (10) for handling a landing gear (20) of an aircraft includes a base (11), an expandable boom (12) that rises from the base (11) and is expandable and contractible, a hoisting boom (13) that is interconnected to the expandable boom (12) in a raisable and lowerable manner, and a holding portion (15) that is suspended on the hoisting boom (13) and retains the landing gear (20).

17 Claims, 12 Drawing Sheets

(58) Field of Classification Search
CPC ... B66C 23/485; B66C 2700/062; B66D 1/50; B64F 5/50; B64F 5/10; B66F 3/10; B66F 7/08
USPC .................................. 269/17; 254/2 B, 10 B
See application file for complete search history.

(56) References Cited

U.S. PATENT DOCUMENTS

| | | | | |
|---|---|---|---|---|
| 3,746,193 | A | * | 7/1973 | Eaves ..................... B66C 1/585 414/569 |
| 3,860,282 | A | * | 1/1975 | Johnson ..................... B66C 3/12 294/112 |
| 4,090,625 | A | * | 5/1978 | Walters ................... B66C 23/48 212/264 |
| 4,708,251 | A | * | 11/1987 | Picard ..................... B66C 23/36 212/294 |
| 5,141,386 | A | * | 8/1992 | Barwise ............... A01G 23/006 137/377 |
| 5,460,474 | A | | 10/1995 | Iles |
| 2004/0169167 | A1 | | 9/2004 | Reinelt et al. |

FOREIGN PATENT DOCUMENTS

| | | |
|---|---|---|
| FR | 1577291 A1 | 8/1969 |
| FR | 2 807 420 A1 | 10/2001 |
| JP | H10-291773 A | 11/1998 |
| JP | 2015-044475 A | 3/2015 |

OTHER PUBLICATIONS

Office action for Japanese application No. 2018-01274 dated Sep. 3, 2019.
Office action for Japanese application No. 2015-205422 dated Mar. 27, 2020.

\* cited by examiner

FRONT ←→ REAR

FRONT ←→ REAR

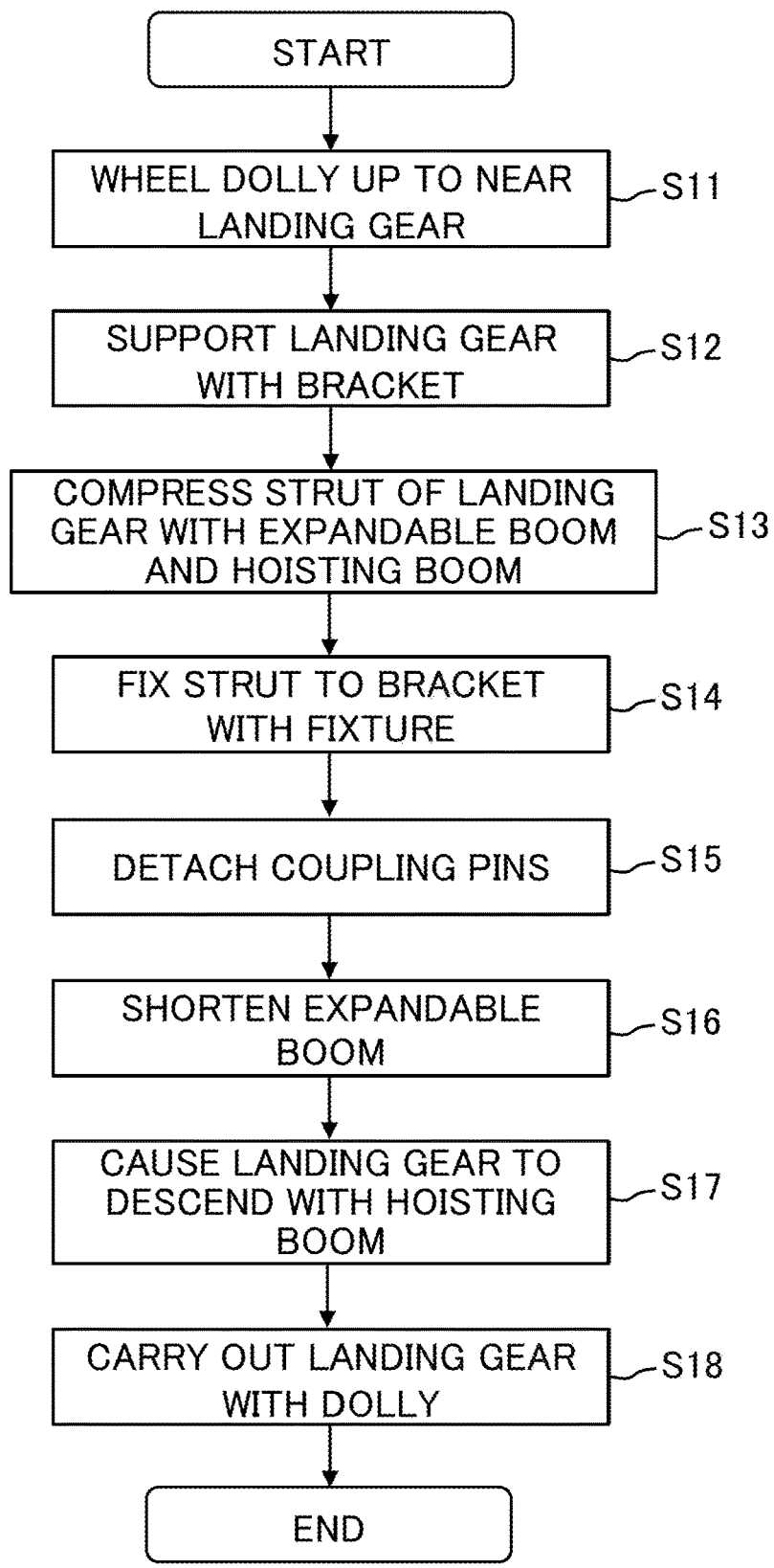

FRONT ↔ REAR

FRONT ← → REAR

DOLLY FOR HANDLING LANDING GEAR OF AIRCRAFT, AND METHOD FOR ATTACHING AND DETACHING LANDING GEAR USING THE SAME

BACKGROUND OF THE INVENTION

Field of the Invention

The present invention relates to a dolly that can be used to attach or detach a landing gear of an aircraft to or from an airframe of the aircraft, and a method for attaching and detaching the landing gear using the same.

Description of the Related Art

When a landing gear (main landing gear or nose gear) is attached to or detached from an airframe in producing or maintaining an aircraft, a dolly that can retain and convey the landing gear is used.

One such dolly is known that has a multi-axial (e.g., 5-axis) position adjustment mechanism. The dolly includes an assembly having a reduction gear train and a rail built therein that constitute a multi-axial position adjustment mechanism. The attitude of a landing gear rigidly fixed to the assembly is adjusted by being displaced in a vertical direction, front-rear direction, and lateral direction, as well as a roll direction, yaw direction, and the like, together with the assembly. In such a manner, a landing gear and an attachment portion of an airframe are accurately positioned.

Japanese Patent Laid-Open No. 2015-44475 describes a dolly used to convey a skin panel while supporting the skin panel in a cantilever manner. In order to position a supporting portion of the dolly and an end portion of the skin panel, the dolly has a position adjustment mechanism that is displaceable in a vertical direction and a direction in a level plane.

In the case of using a dolly including an assembly that has a multi-axial position adjustment mechanism and is fixed to a landing gear, it is necessary to adjust each of multiple axes to adjust the attitude of the landing gear, which takes a long time for positioning work.

Even in the case of intending to perform a rough position adjustment initially, the landing gear has to be displaced little by little by rotating operation of a handle via a reduction gear train, which makes it difficult to perform position adjustment swiftly.

Furthermore, the assembly includes many components such as a gear, a rail, and the like, and is demanded to have sufficient rigidity to bear a load of the landing gear and its own weight, which makes the assembly large and makes the dolly large as a whole.

In addition, the assembly needs a height equivalent to a stroke in a vertical direction that is necessary to cause the landing gear to reach an attachment portion of an airframe positioned above, which makes the dolly tall.

For the convenience of storing or handling in a maintenance field in an airport, a small dolly is desired.

Considering the above, the present invention has an objective to provide a dolly for handling landing gear of an aircraft that enables, while being downsized, work of positioning the landing gear with respect to an attachment portion of an airframe of the aircraft to be performed efficiently, and a method for attaching or detaching a landing gear using the dolly.

SUMMARY OF THE INVENTION

The present invention is a dolly for handling a landing gear of an aircraft, the dolly including a base, an expandable member that rises from the base and is expandable and contractible, a hoisting member that is interconnected to the expandable member in a raisable and lowerable manner, and a holding portion that is suspended on the hoisting member and retains the landing gear.

The expandable member of the dolly of the present invention preferably inclines with respect to a vertical direction in conformity with an inclining strut of the landing gear. The expandable member can be given the same inclination direction and inclination angle as those of the strut.

The holding portion of the dolly of the present invention is preferably suspended on the hoisting member via a rod.

The holding portion of the dolly of the present invention preferably includes a bracket that supports the landing gear, a fixture that is fixed to the landing gear supported by the bracket to give the landing gear an inclination with respect to the vertical direction, and a winch that pulls the bracket to control the attitude of the landing gear.

The present invention is a method for attaching a landing gear to an airframe using the dolly previously described, the method including a first step of causing a holding portion to retain the landing gear, a second step of causing the landing gear to ascend toward an attachment portion of the airframe with the hoisting member, a third step of causing an expandable member to expand, and a fourth step of coupling the landing gear and the attachment portion of the airframe.

The present invention is a method for detaching a landing gear from an airframe using the dolly previously described, the method including a first step of causing the holding portion to retain the landing gear, a second step of releasing a coupling between the landing gear and an attachment portion of the airframe, a third step of causing an expandable member to contract, and a fourth step of causing the landing gear to descend with the hoisting member.

According to the dolly of the present invention, with the expandable member and the hoisting member, it is possible to suppress the height of the dolly when the expandable member is caused to contract and the hoisting member is lowered, while securing a stroke in the vertical direction necessary for the attachment and detachment of the landing gear.

In addition, by driving the expandable member and the hoisting member with a hydraulic actuator or the like, it is possible to move the landing gear quickly.

Moreover, since the holding portion and the landing gear suspended on the hoisting member are allowed to swing, it is possible to easily perform fine adjustment of the attitude of the landing gear to a desired direction so as to position the attachment portion of the airframe and the landing gear.

A positioning mechanism in the present invention is implemented by including the expandable member and the hoisting member, and by suspending the holding portion and the landing gear. For this reason, the positioning mechanism does not require such a high rigidity that is required for a configuration in which an assembly rigidly fixed to the landing gear is moved together with the landing gear.

According to the above, it is possible to, while downsizing the dolly, efficiently perform work of positioning the landing gear with respect to an attachment portion of the airframe of the aircraft.

BRIEF DESCRIPTION OF THE DRAWINGS

FIG. 5 is a flow chart illustrating a procedure of detaching the landing gear from the airframe;

DETAILED DESCRIPTION OF THE PREFERRED EMBODIMENTS

Hereinafter, an embodiment of the present invention will be described with reference to the accompanying drawings.

Figure 1:
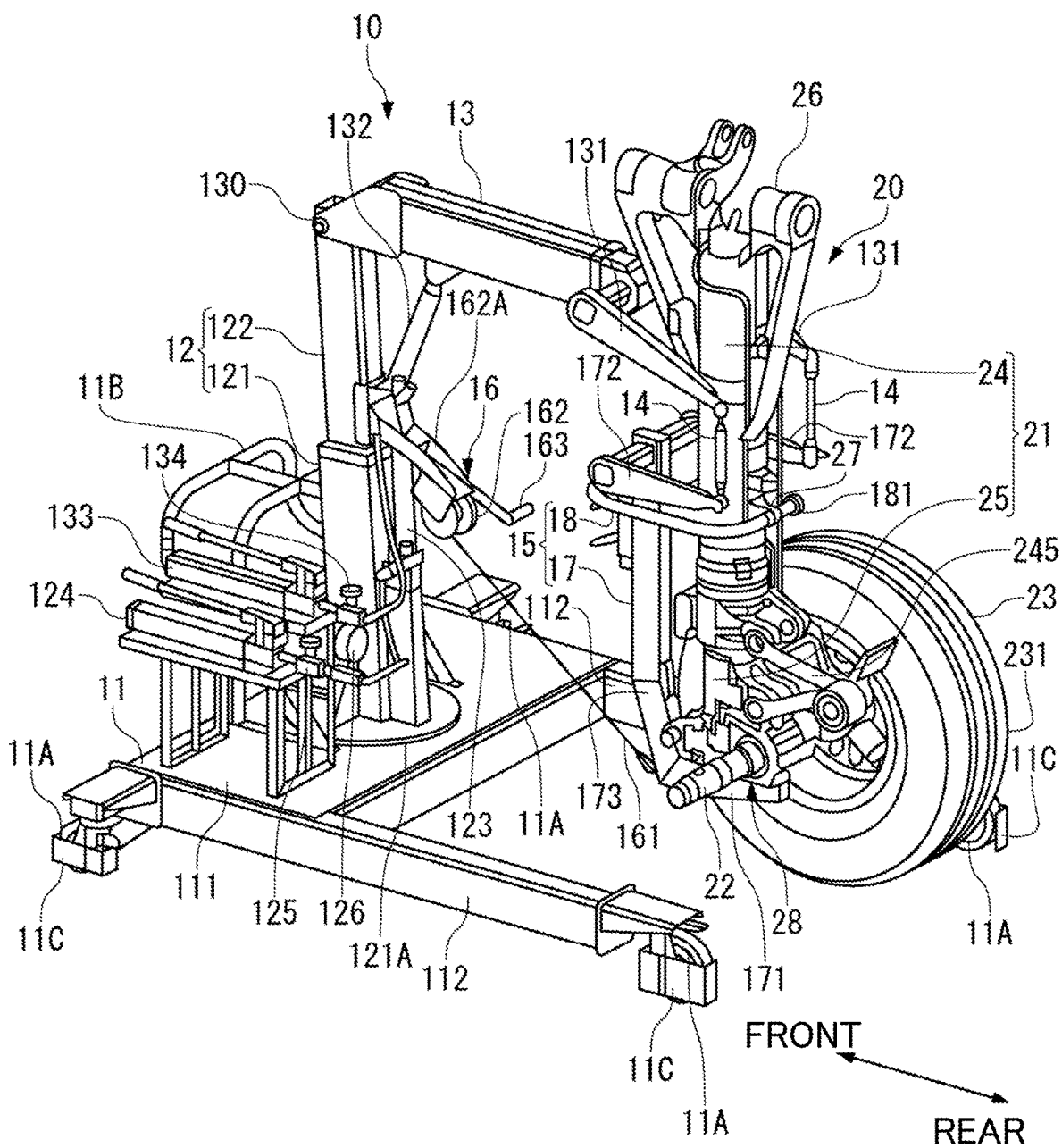
FIG. 1 is a perspective view illustrating a dolly for handling a landing gear (main landing gear) of an aircraft according to an embodiment of the present invention.

A dolly 10 illustrated in FIG. 1 is used for handling a landing gear 20 of an aircraft when the landing gear 20 is attached or detached from an airframe.

Of a main landing gear and a nose gear, which are both landing gears, the dolly 10 in the present embodiment handles the main landing gear.

In the present embodiment, it is assumed that the term "handling" refers to operations of handling the landing gear 20 in general necessary for attaching or detaching the landing gear 20, such as retaining, positioning, and carrying in or out the landing gear 20.

(1) Configuration of Landing gear

The configuration of the landing gear 20 will be first described.

The landing gear 20 includes a strut 21 in which an impact absorbing mechanism, a brake, and the like are built, and wheels 23 that are provided in an axle 22. The landing gear 20 includes a pair of wheels 23 that are supported by the axle 22 on both the lateral sides of the strut 21.

The axle 22 is offset rearward with respect to the axis line of the strut 21. The wheels 23 are each provided with a tire 231. In the drawings including FIG. 1, one of the wheels that is positioned on the frontward side of the paper is not illustrated.

On both the lateral sides of the airframe, a pair of landing gears 20 are provided.

In the present specification, the node side of the aircraft is defined as front, and the tail side of the aircraft is defined as rear.

The upper side in a vertical direction is defined as up, and the lower side in the vertical direction is defined as down.

The left side and the right side of the aircraft traveling forward are defined as left and right, respectively.

Figure 2:
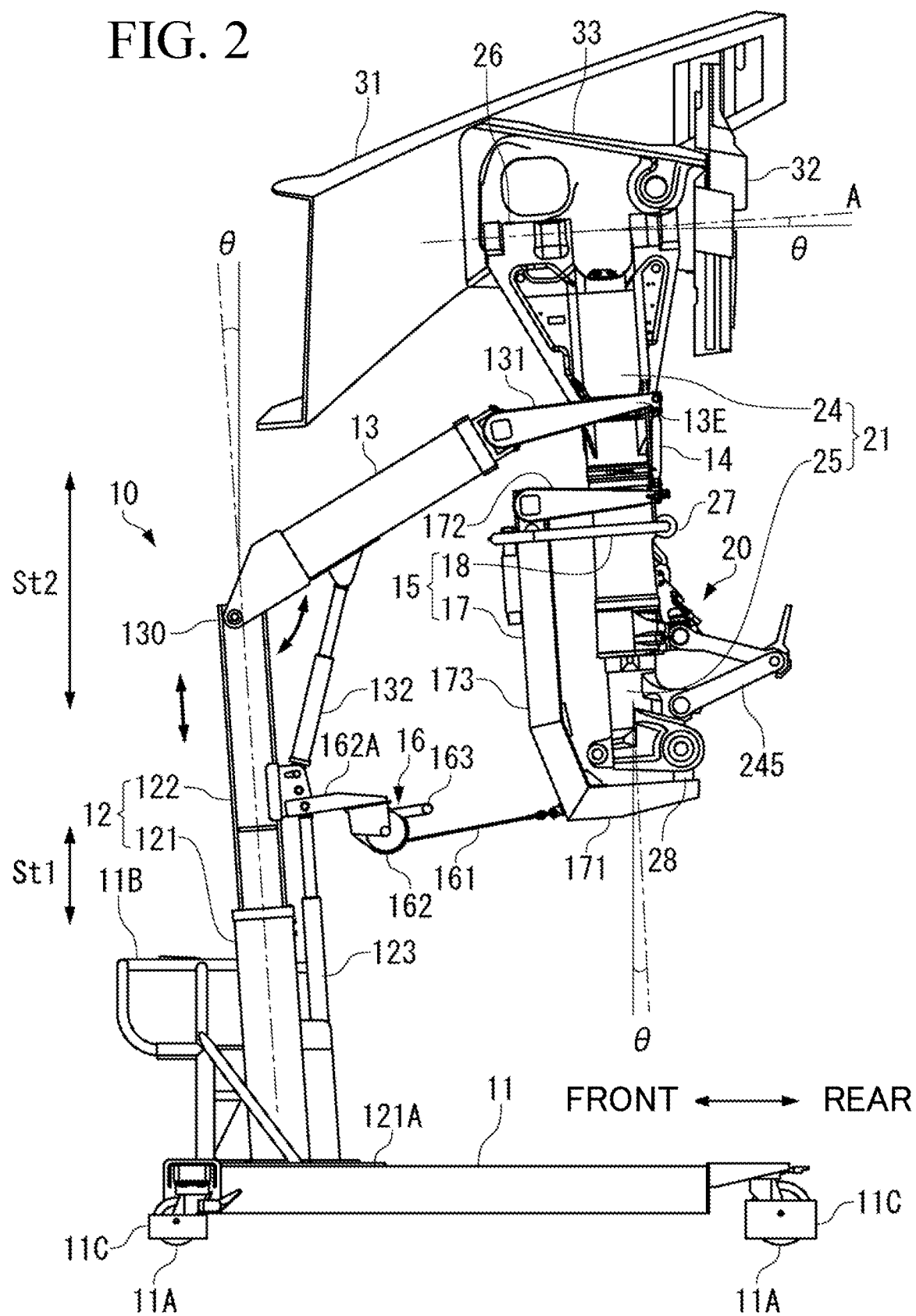
FIG. 2 is a side view illustrating the dolly and the landing gear.

As illustrated in FIG. 1 and FIG. 2, the strut 21 includes an outer strut 24 that is coupled to structure members of the airframe, an inner strut 25 that supports the wheels 23, and a strut link 245 that connects the outer strut 24 and the inner strut 25.

The upper-end side of the inner strut 25 is inserted into the inside of the outer strut 24. The total length of the entire strut 21 can expand or contract in length by the inner strut 25 projecting and retracting with respect to the outer strut 24. An impact at landing is absorbed by the strut 21 expanding and contracting.

The outer strut 24 is provided with a coupled portion 26 that is coupled to structure members 31 and 32 of the airframe, and a lug 27 to which a wire rope is attached to moor the landing gear 20 to the ground in parking.

The inner strut 25 is provided with a jacking-up portion 28 that is disposed on pads of a jack to jack the airframe up for changing the tire 231, for example. The jacking-up portion 28 is positioned in the vicinity of the axle 22.

Since the strut 21 stably supports the load of the airframe landing with the nose of the airframe pulled up, the strut 21 inclines in a front-rear direction with respect to the vertical direction, as illustrated in FIG. 2. The upper end of the strut 21 is positioned forward of the lower end of the strut 21. An inclination angle θ of the axis line of the strut 21 (illustrated by a dash-dot line) with respect to the vertical direction (illustrated by a solid line) is, for example, a few degrees.

In FIG. 2, a right main wing is seen from a fuselage side.

The coupled portion 26 of the strut 21 is supported by the structure members 31 and 32 of the main wing so as to be rotationally movable about a rotational movement axis A that is illustrated by a dash-dot line. By an arm and an actuator (not illustrated) that interconnect between the outer strut 24 and the structure members 31 and 32 of the main wing, the strut 21 is moved rotationally toward the front side of the paper of FIG. (left side) to be received in the inside of the main wing or is moved rotationally from the inside of the main wing toward the back side of the paper of FIG. 2 (right side) to be deployed.

The rotational movement axis A is set along a direction inclining, with respect to the front-rear direction that is illustrated by a solid line, toward the vertical directions by the inclination angle θ that is the same as that of the axis line of the strut 21. This rotational movement axis A forms a right angle with respect to the axis line of the strut 21.

Figure 3:
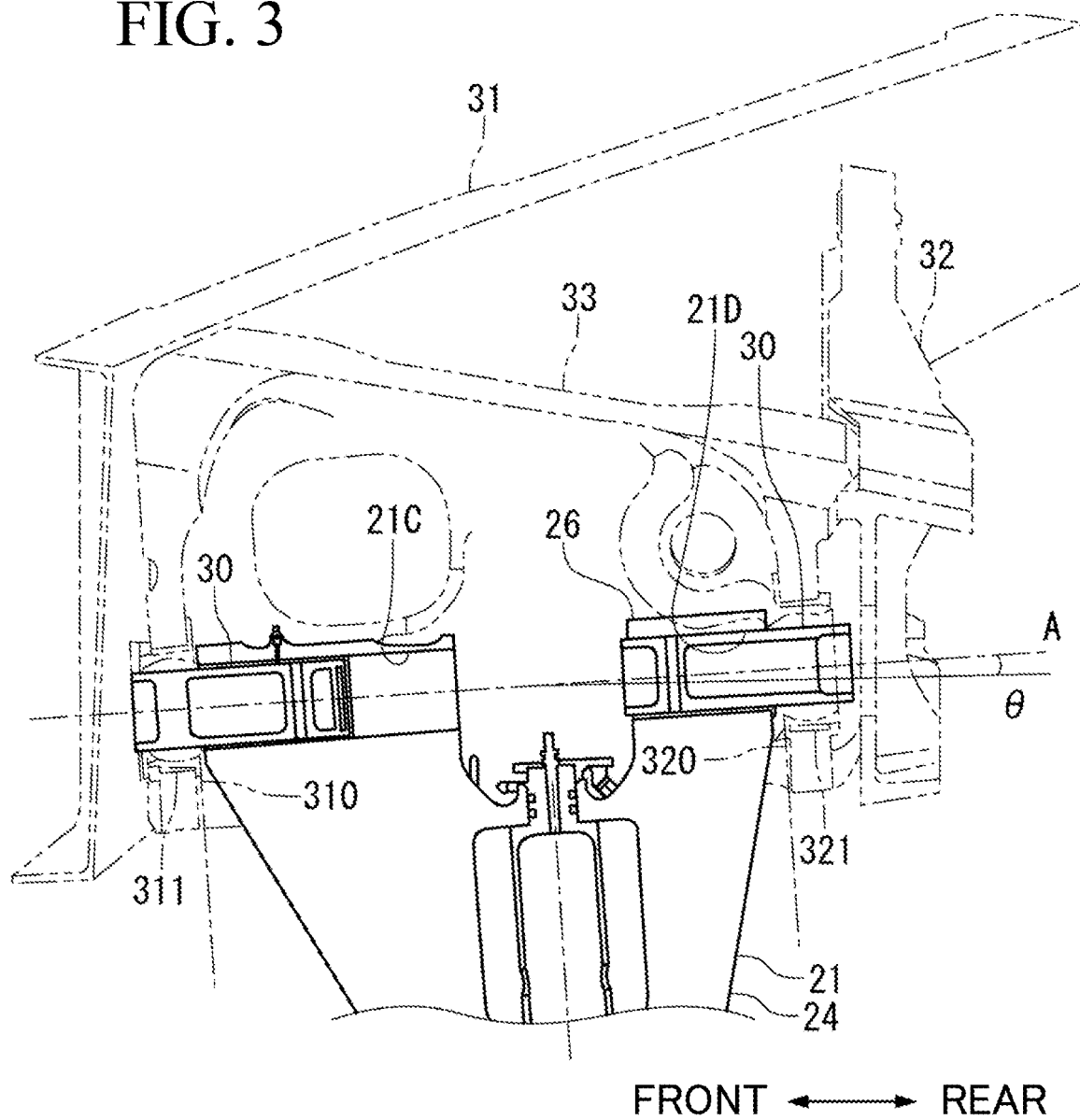
FIG. 3 is a drawing illustrating a coupled portion between the landing gear and an airframe (main wing) (a partially enlarged view of FIG. 2)

As illustrated in FIG. 3, on the line of the rotational movement axis A, coupling pins 30 and 30 are disposed.

The coupled portion 26 of the strut 21 is aligned with the structure members 31 and 32, and the coupling pins 30 and 30 are inserted from both of the sides in the front-rear direction, whereby the coupled portion 26 and the members 31 and 32 are pin-coupled.

The structure member 31 is a rear spar that constitutes the main wing, and the structure member 32 is an auxiliary spar that is provided in the rear spar 31 via a fitting 33.

One of the coupling pins 30 is inserted into the inside of a bearing 311 that is provided in the rear spar 31, and into a hole 21C that is formed in the coupled portion 26.

The other one of the coupling pins 30 is inserted into the inside of a bearing 321 that is provided in the auxiliary spar 32, and into a hole 21D that is formed in the coupled portion 26.

To attach the landing gear 20 to the structure of the main wing, the coupled portion 26 of the strut 21 is inserted between a coupling plane 310 of the rear spar 31 that is orthogonal to the rotational movement axis A, and a coupling plane 320 of the auxiliary spar 32 that is similarly orthogonal to the rotational movement axis A. FIG. 3 illustrates a line along the coupling plane 310 and a line along the coupling plane 320, in the form of chain double-dashed lines.

The coupling planes 310 and 320 incline in the front-rear direction with respect to the vertical direction, as with the axis line of the strut 21.

(2) Configuration of Dolly

The configuration of the dolly 10 will be next described.

The dolly 10 includes, as illustrated in FIG. 1, a base 11, an expandable boom 12, a hoisting boom 13, a holding portion 15 that is suspended by booms 12 and 13, and a winch 16.

The base 11 (see FIG. 1) includes a plurality of casters 11A and a grip 11B.

Here, two of the four casters 11A are provided in a region 111 where the expandable boom 12 is vertically arranged in the base 11, and the other two are provided in portions 112 and 112 that extend being parallel to each other in such a manner as to project from the region 111. Above the space between the portions 112 and 112, the landing gear 20 is suspended. The wheels 23 of the suspended landing gear 20 can be descended to a floor that is exposed between the portions 112 and 112.

The casters 11A are swivel casters each have a wheel (or roller) the supporting portion of which is attached to the base 11 so as to be rotatable in a level plane, and are each configured to be stoppable with a lock 11C.

Pushing the grip 11B drives the dolly 10 with the casters 11A, whereby the landing gear 20 retained on the dolly 10 can be conveyed.

The dolly 10 includes the expandable boom 12 and the hoisting boom 13, and has a main feature to suspend the holding portion 15 and the landing gear 20 with these booms 12 and 13.

The expandable boom 12 and the hoisting boom 13 are both members that extend substantially linearly along their axis line directions. These booms 12 and 13 bring a stroke in the vertical direction that is necessary to attach and detach the landing gear 20.

The expandable boom 12 (see FIG. 1 and FIG. 2) includes an outer barrel 121 that rises from a mount 121A fixed to the base 11, and an inner barrel 122 that is inserted into the upper-end side of the outer barrel 121 and interconnected to the hoisting boom 13. Part of the inner barrel 122 is drawn out from the outer barrel 121 by an expandable actuator 123 that is provided being parallel to the axis line of the outer barrel 121 and the inner barrel 122, whereby the entire expandable boom 12 expands to any length. FIG. 2 illustrates a stroke St1 of the expandable boom 12 in the vertical direction.

The expandable actuator 123 works on a hydraulic pump 124 (see FIG. 1) being manually operated. When a valve 125 (see FIG. 1) releases oil pressure, the inner barrel 122 is received in the outer barrel 121 by its own weight, which causes the total length of the expandable boom 12 to be shortened. To make the expandable boom 12 expand and contract smoothly, a resin material (not illustrated) for reducing friction is provided between the outer barrel 121 and the inner barrel 122.

To provide redundancy of work on making the expandable boom 12 contract to descend the landing gear 20, in the present embodiment, an operation of a shut-off valve (not illustrated) is needed prior to the release of oil pressure with the valve 125.

As illustrated in FIG. 2, the expandable boom 12 inclines in the front-rear direction with respect to the vertical direction (illustrated by a solid line). The direction and an inclination angle θ of the inclination is the same as those of the strut 21 of the landing gear 20, and the expandable boom 12 expands and contracts in parallel to the axis line of the strut 21, which is illustrated by an arrow in FIG. 2.

The hoisting boom 13 (see FIG. 1 and FIG. 2) is interconnected to the inner barrel 122 of the expandable boom 12 in a raisable and lowerable manner.

The hoisting boom 13 is supported at the upper end of the inner barrel 122 of the expandable boom 12 in such a manner as to be rotationally movable about the axis 130.

By a hoisting actuator 132 that is attached to the inner barrel 122 of the expandable boom 12, the hoisting boom 13 is rotationally moved at any angle between a lowered state (FIG. 1) to a state of being raised toward a position above the upper end of the expandable boom 12 (FIG. 2) (see an arrow of FIG. 2). In the lowered state, the hoisting boom 13 forms a slight angle in a downward direction with the expandable boom 12.

FIG. 2 illustrates a stroke St2 of the hoisting boom 13 in the vertical direction.

By providing both the expandable boom 12 and the hoisting boom 13 in the dolly 10, it is possible to limit the height of the dolly 10 while gaining a large stroke (St1+St2) as compared with the case of providing a single boom.

The hoisting actuator 132 works on a hydraulic pump 133 (see FIG. 1) being manually operated.

By pushing up the vicinity of the axis 130, which is a fulcrum of the hoisting boom 13, with the hoisting actuator 132, a large amount of displacement is gained at the distal end of the hoisting boom 13 relative to the amount of displacement of the actuator.

When a valve 134 (see FIG. 1) releases oil pressure, the hoisting boom 13 descend to the lowered state by its own weight. Prior to the release of oil pressure with the valve 134, an operation of a shut-off valve (not illustrated) is preferably needed.

The holding portion 15 (see FIG. 1 and FIG. 2) is suspended by the expandable boom 12 and the hoisting boom 13 via link rods 14. The holding portion 15 suspended via the link rods 14, and the booms 12 and 13 supporting the holding portion 15 constitute a link mechanism. The link mechanism is given a degree-of-freedom, enabling relative displacement between the holding portion 15 and the booms 12 and 13.

The holding portion 15 includes a bracket 17 that supports the strut 21 of the landing gear 20, and a fixture 18 that fixes the strut 21 to the bracket 17.

The bracket 17 includes a supporting portion 171 that supports the strut 21, an arm 172 that sandwiches the strut 21 from both the lateral sides above the supporting portion 171, and an interconnecting portion 173 that interconnects the supporting portion 171 and the arm 172 on the front side of the strut 21. The bracket 17 is formed in a substantially C shape in side view.

The supporting portion 171 receives the load of the landing gear 20 at the position of the jacking-up portion 28 provided in the inner strut 25. The jacking-up portion 28 and portions therearound have sufficient rigidities and strengths to support the landing gear 20 at the supporting portion 171. The supporting portion 171 includes a holder (not illustrated) having a concavity where the jacking-up portion 28 is disposed, and the strut 21 is positioned on the supporting portion 171 with the jacking-up portion engaged with the holders.

Figure 4:
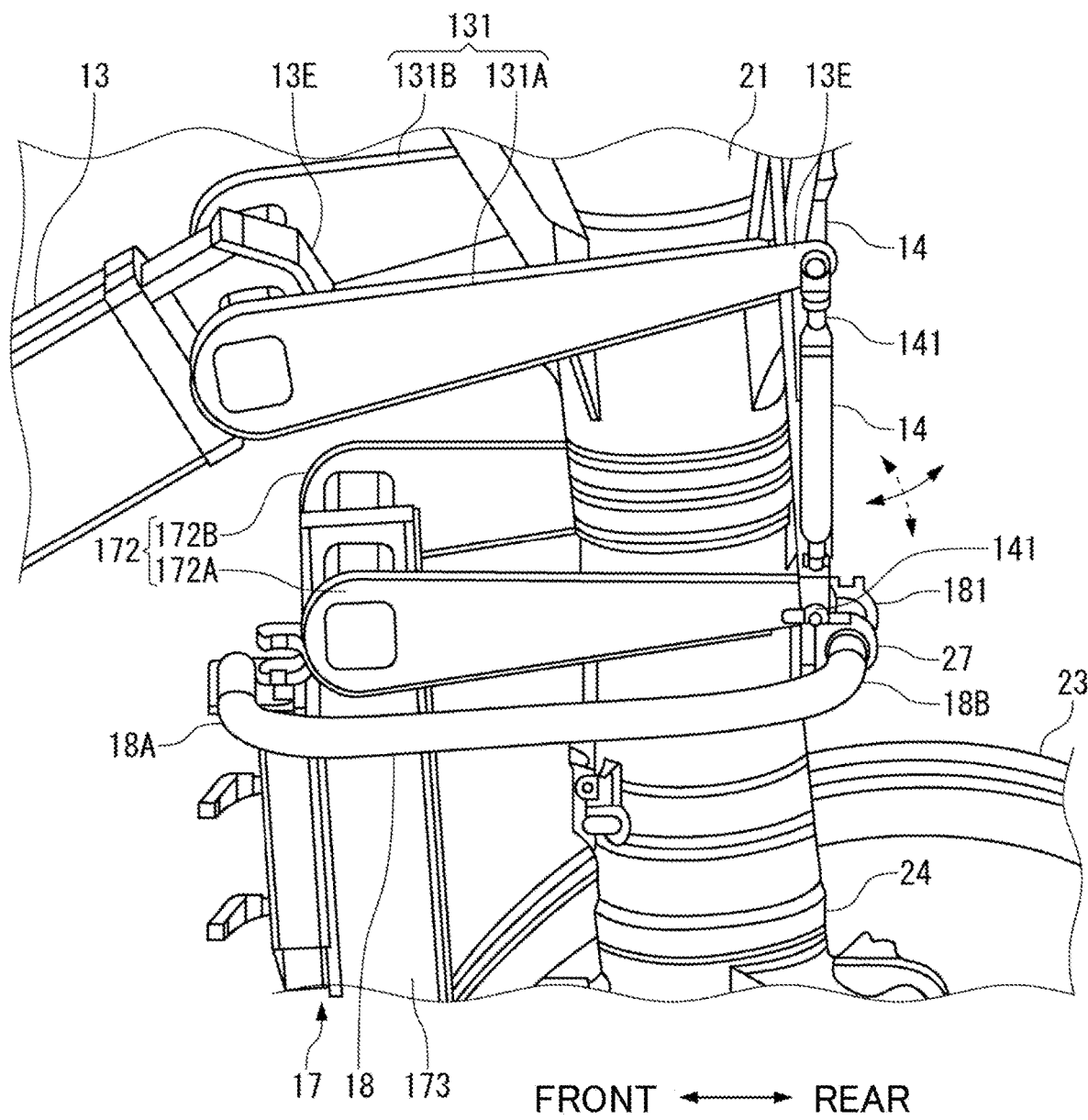
FIG. 4 is a drawing illustrating a spot where the landing gear is fixed to a bracket with a fixture.

The arm 172 includes, as illustrated in FIG. 1 and FIG. 4, a pair of members 172A and 172B, respectively that are disposed on both the lateral sides of the strut 21 being fixed to the interconnecting portions 173.

The fixture 18 includes, as illustrated in FIG. 4, a front end 18A that is fixed to the interconnecting portion 173 being positioned forward, and a rear end 18B that is fixed on the rear side of the strut 21. The rear end 18B of the fixture 18 is fixed to the strut 21 with a fixing pin 181 that is inserted into the hole of the lug 27 of the strut 21.

The fixture 18 is bent into a C shape as a whole when viewed in the vertical direction, and disposed beneath the member 172A of the arm 172.

The strut 21 is surrounded by the arm 172 and the fixture 18 in a state where no gap larger than the strut 21 arises around the strut 21. For this reason, it is possible to fix the strut 21 to the bracket 17 preventing the strut 21 from falling.

The arm 172 and the fixture 18 retain the strut 21 at the position or in the vicinity of the center of gravity of the strut 21.

As illustrated in FIG. 2, the holding portion 15 is suspended by the booms 12 and 13. The landing gear 20 is also suspended together with the holding portion 15 in a state of being retained by the holding portion 15.

A distal end 13E of the hoisting boom 13 that suspends the holding portion 15 and the landing gear 20 is positioned above the center of gravity of the strut 21, whereby the landing gear 20 and the holding portion 15 are stably suspended.

In the present embodiment, the landing gear 20 is attached to or detached from the airframe with the wheels 23 detached from the strut 21. For this reason, in particular, to stabilize the attitude of the landing gear 20 in the attachment and detachment, the strut 21 is retained with the arm 172 and the fixture 18 at the position or in the vicinity of the center of gravity of the strut 21 from which the wheels 23 are detached, and the strut 21 is suspended from the distal end 13E of the hoisting boom 13 upper than the center of gravity of the strut 21 from which the wheels 23 are detached.

Even when the wheels 23 are attached to the strut 21 and the position of the center of gravity is lowered, the arm 172 and the fixture 18 retain the landing gear 20 in a sufficiently stable manner. In addition, the positions to retain and suspend the landing gear 20 are determined also taking into consideration the center of gravity of the holding portion 15.

In the present embodiment, the link rods 14 are interposed between the holding portion 15 and the hoisting boom 13. The holding portion 15 is suspended in a swingable manner via the link rods 14 from hoisting arm 131 provided in the hoisting boom 13.

As illustrated in FIG. 1 and FIG. 4, the pair of link rods 14 and 14 are disposed on both the lateral sides of the strut 21, respectively. These link rods 14 and 14 interconnect the hoisting arm 131 provided in the hoisting boom 13 and the arm 172 of the holding portion 15.

As the hoisting arm 131, the hoisting boom 13 includes a pair of members 131A and 131B that are integrally provided in the hoisting boom 13. Between these members 131A and 131B, the strut 21 is disposed.

As illustrated in FIG. 4, the link rod 14 is vertically suspended from the distal end of the member 131A of the hoisting arm 131, and to the lower end of the link rod 14, the member 172A of the arm 172 of the holding portion 15 is connected. This is also true for the link rod 14 that is vertically suspended from the distal end of the member 131B of the hoisting arm 131.

Any one or both of the ends of the link rod 14 are preferably provided with spherical bearings 141. This makes the link rods 14 swingable in any directions including a direction of rotating about an axis that intersects with the paper of FIG. (see a solid-line arrow), a direction of intersecting with the paper (see a broken-line arrow), and the like.

In the present embodiment, the spherical bearings 141 are provided at both ends of each of the link rods 14 and 14.

As the spherical bearing 141, for example, a spherical bearing in which a spherical surface is formed on each of an inner circumferential portion of a bush and an outer circumferential portion of a sliding portion that is housed in the bush, a spherical roller bearing, a ball bearing, a rod end bearing, and the like can be used.

The spherical bearings 141 couple between the upper end of the link rod 14 and the distal end 13E of the hoisting arm 131, and connect the lower end of the link rod 14 and the distal end of the arm 172 of the holding portion 15.

The holding portion 15 and the landing gear 20 are suspended to be allowed to swing, which enables the holding portion 15 and the landing gear 20 to be adjusted to appropriate attitudes (inclination angles) and to be positioned accurately with respect to the attachment portions of the airframe (structure members 31 and 32).

In the present embodiment, at the time of attaching the landing gear 20, the attitude of the landing gear 20 is controlled to a predetermined inclination angle by the fixture 18 and the winch 16. A method of the control will be described.

The winch 16 (see FIG. 1 and FIG. 2) includes a wire rope 161, a drum 162 that reels in the wire rope 161, and a handle 163 that rotates the drum 162.

The drum 162 is fixed to the inner barrel 122 of the expandable boom 12 with a bracket 162A.

The wire rope 161 is attached to the lower end of the interconnecting portion 173 of the bracket 17.

The wire rope 161 moors the holding portion 15 to the expandable boom 12, which restricts the swing of the landing gear 20 retained with the holding portion 15 within a range necessary for the adjustment of the inclination angle.

When the wire rope 161 is reeled into the drum 162 by operating the handle 163, the bracket 17 is pulled by the wire rope 161 to be displaced toward the expandable boom 12.

With the displacement of the bracket 17, the attitude of the strut 21 retained with the bracket 17 is controlled to a predetermined inclination angle.

(3) Detachment of Landing gear

There will be described a procedure of work of detaching the landing gear 20 from the airframe using the dolly 10 having the configuration described above (see FIG. 5). The description will be made with reference to FIG. 5 to FIG. 7B.

The airframe of the aircraft is placed, at a position higher than in parking, on a frame construction (not illustrated) that is installed in a manufacturing facility of the aircraft or a hangar for maintenance.

As an advance preparation, the strut 21 of the landing gear 20 that has been spread below the main wing is compressed.

In the present embodiment, the detachment of the landing gear 20 is performed in a state where the wheels 23 remain attached. It is also preferable to perform the detachment of the landing gear 20 from the airframe in a state where the wheels 23 are detached from the strut 21. This is also true for the attachment of the landing gear 20, which will be described with reference to FIG. 8 to FIG. 10.

In the detachment of the landing gear 20, the dolly 10 is wheeled up to near the landing gear 20 (step S11). In this regard, the dolly 10 is moved rearward from a position forward of the landing gear 20. At this point, the hoisting boom 13 extends rearward from the upper end of the expandable boom 12.

Then, the casters 11A are locked beneath the landing gear 20 to make the dolly 10 standstill. The dolly 10 is displaced on the level plane of the floor.

Next, the landing gear 20 is retained with the holding portion 15.

Figure 6A:
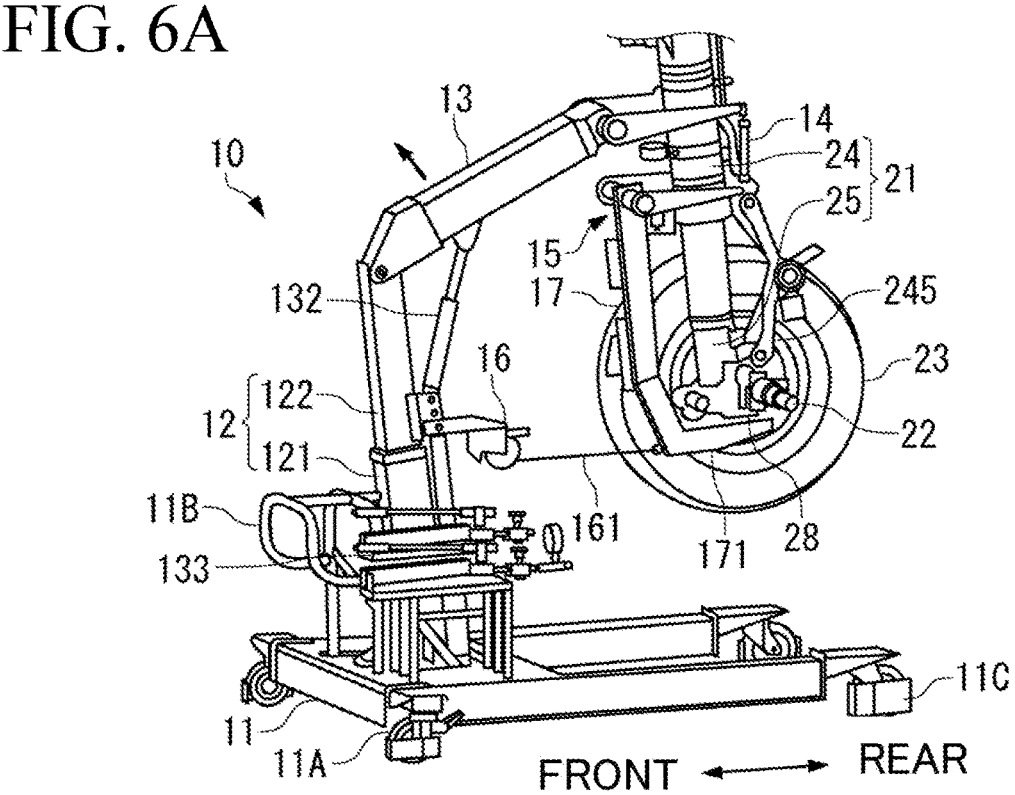
FIG. 6A and FIG. 6B are drawings illustrating a process of detaching the landing gear from the airframe.

First, as illustrated in FIG. 6A, the supporting portion 171 of the bracket 17 is inserted between the pair of wheels 23 and 23 (only one of them is illustrated), and the hoisting boom 13 is raised with the hydraulic pump 133, whereby the jacking-up portion 28 is supported by the supporting portion 171 (step S12).

While being tied to the expandable boom 12 with the wire rope 161, the bracket 17 is suspended to be allowed to swing, and it is possible to control the attitude of the bracket 17 so as to dispose the supporting portion 171 on the jacking-up portion 28.

Figure 6B:
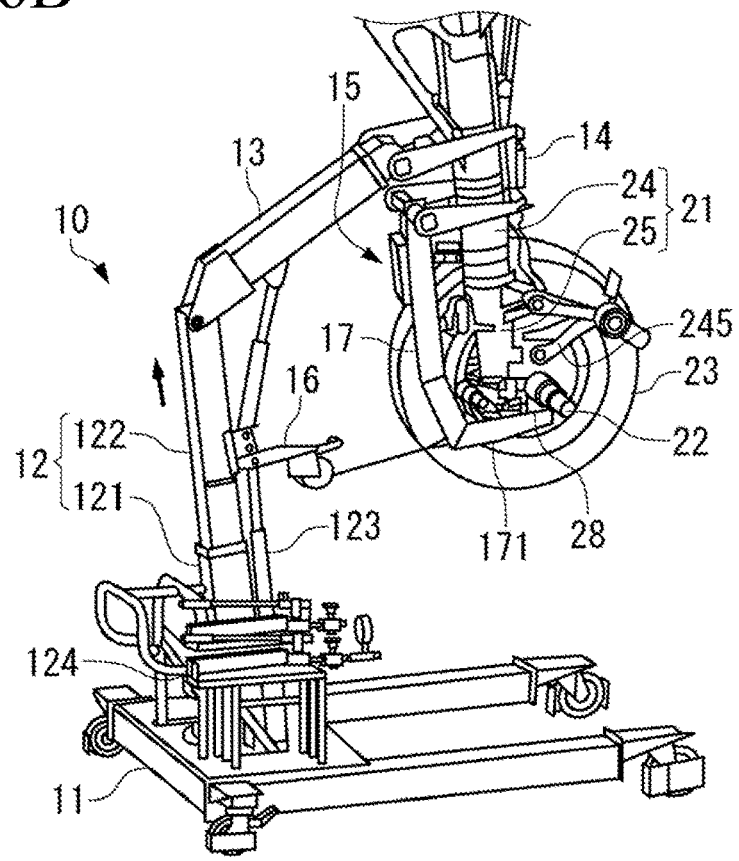

Subsequently, as illustrated in FIG. 6B, the expandable boom 12 and the hoisting boom 13 are used to cause the holding portion 15 to ascend so as to compress the strut 21 to the maximum (step S13).

When the expandable boom 12 is caused to expand with the hydraulic pump 124, the inner barrel 122 is drawn upward from the outer barrel 121, the bracket 17 suspended from the hoisting boom 13 interconnected to the expandable boom 12 ascend. With the ascent, the inner strut 25 supported by the bracket 17 on the jacking-up portion 28 is pushed into the outer strut 24.

At the time of causing the expandable boom 12 to expand, the strut 21 can be compressed stably, with the inner barrel 122 and the bracket 17 tied together with the wire rope 161 that is reeled out from the drum 162 by a predetermined length.

Procedures to compress the strut 21 at the maximum with the booms 12 and 13 include, for example, one in which the expandable boom 12 is caused to expand by the length of the stroke St1 (see FIG. 2) in parallel to the axis line of the strut 21, and the hoisting boom 13 is thereafter raised to a height that is necessary to compress the strut 21 to a maximum position. At the time of raising the hoisting boom 13, it is preferable to keep the attitude of the landing gear 20 by operating the winch 16 as necessary.

Note that the order of using the expandable boom 12 and the hoisting boom 13 does not matter.

Afterward, the strut 21 is fixed to the bracket 17 with the fixture 18 (see FIG. 4, step S14). Specifically, the front end 18A of the fixture 18 is fixed to the interconnecting portion 173 of the bracket 17, and the rear end 18B of the fixture 18 is fixed to the lug 27 of the strut 21 with the fixing pin 181.

After the landing gear 20 is securely retained with the holding portion 15 in such a manner, the coupling pins 30 and 30 (see FIG. 3) are pulled out from the coupled portion 26 of the strut 21, and the rear spar 31 and the auxiliary spar 32 of the main wing so as to release the coupling between the landing gear 20 and the airframe (step S15).

At this point, by performing the coupling release while the expandable boom 12 is caused to expand with the hydraulic pump 133, the coupling pins 30 and 30 can be pulled out smoothly. Then, it is preferable to use the hydraulic gauge 126 (FIG. 1) to confirm that the load of the landing gear 20 is applied to the dolly 10 by the coupling release.

Thereafter, the expandable boom 12 and the hoisting boom 13 are operated to cause the landing gear 20 to descend to the floor.

Figure 7A:
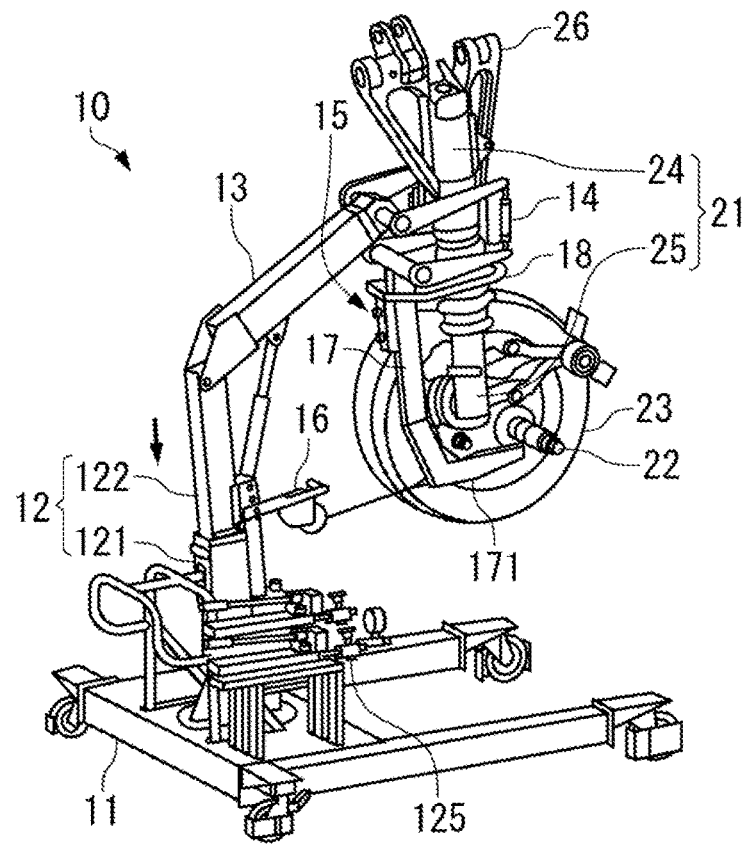
FIG. 7A and FIG. 7B are drawings illustrating the process of detaching the landing gear from the airframe.

First, as illustrated in FIG. 7A, the inner barrel 122 of the expandable boom 12 is drawing into the outer barrel 121 by operating the valve 125, and the length of the expandable boom 12 is shortened (step S16). Then, along the axis line of the strut 21 that is parallel to the expandable boom 12, the coupled portion 26 of the strut 21 is pulled out smoothly from between the coupling planes 310 and 320 (see FIG. 3), and the strut 21 descends downward. At this point, since the inner barrel 122 and the bracket 17 are tied together with the wire rope 161, it is possible to cause the landing gear 20 to descent stably.

Figure 7B:
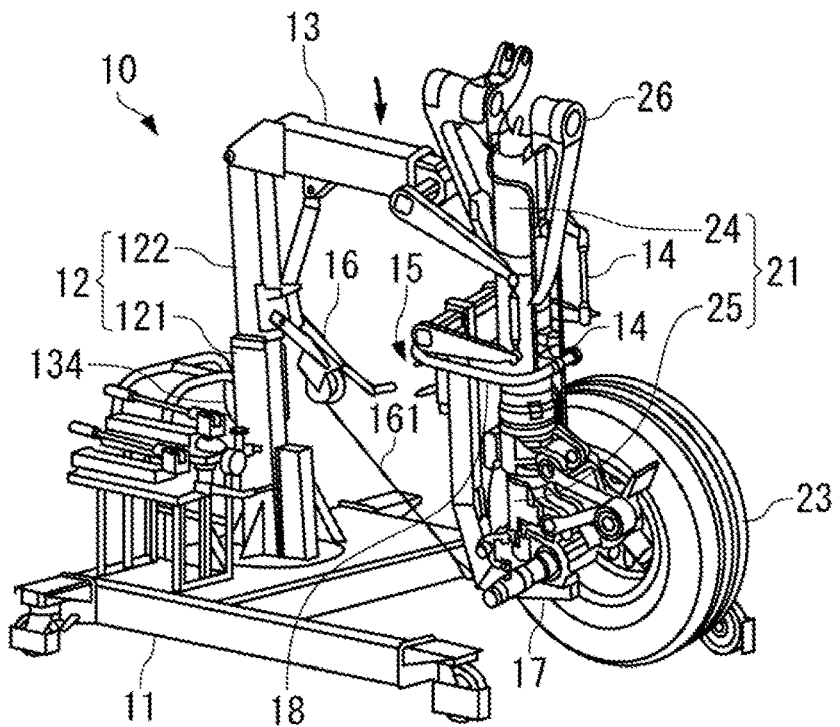

Furthermore, as illustrated in FIG. 7B, the hoisting boom 13 is rotationally moved downward to cause the wheels 23 of the landing gear 20 to descend near the floor (step S17). By operating the valve 134, the hoisting boom 13 can be caused to descend.

At the time of causing the hoisting boom 13 descend, it is preferable to keep the attitude of the landing gear 20 almost along the vertical direction by operating the winch 16 to control the length of the wire rope 161.

Afterward, the dolly 10 is wheeled with the wheels 23 lifted up using only the casters 11A to carry out the landing gear 20 to a place away from the airframe (step S18).

In such a manner, the detachment work of the landing gear 20 is completed.

(4) Attachment of Landing gear

Figure 8:
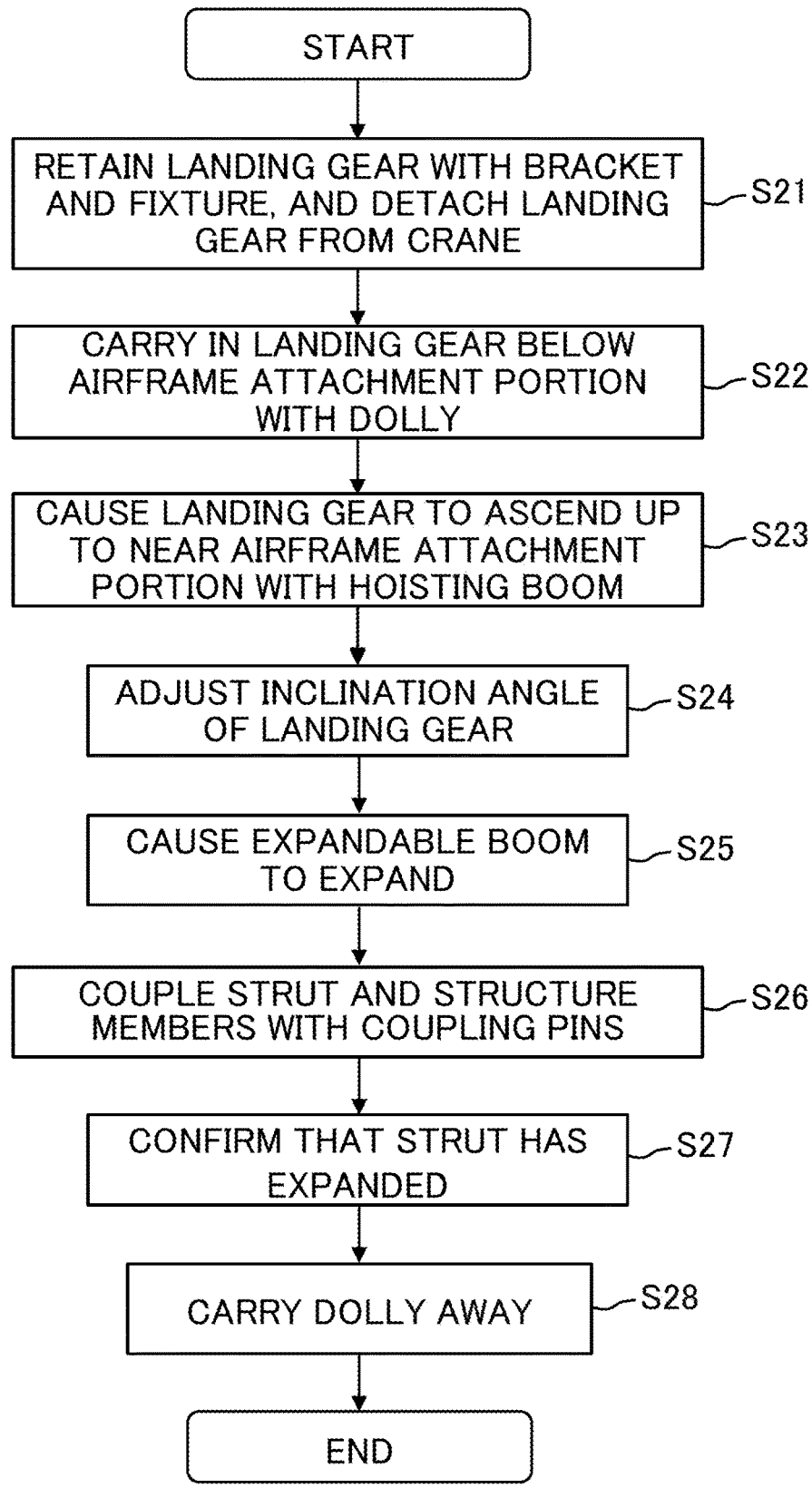
FIG. 8 is a flow chart illustrating a procedure of attaching the landing gear to the airframe.

Now, with reference to FIG. 8 to FIG. 10, there will be described a procedure of attaching the landing gear 20 to the airframe (FIG. 8).

As an advance preparation, the landing gear 20 is suspended on a crane (not illustrated) provided on a ceiling or the like of a maintenance facility or a hangar for housing the aircraft, and the strut 21 of the landing gear 20 is compressed.

Figure 9A:
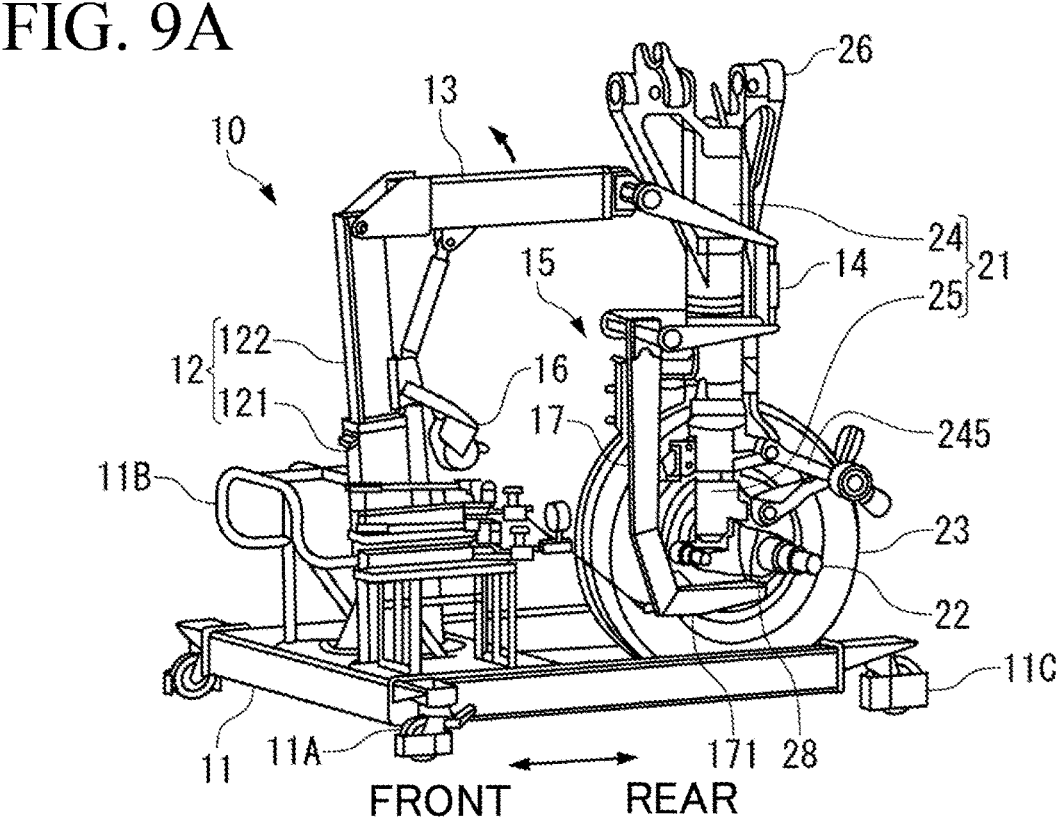
FIG. 9A and FIG. 9B are drawings illustrating a process of attaching the landing gear to the airframe.

Then, the dolly 10 is disposed on the front side of the landing gear 20 suspended on the crane, and as illustrated in FIG. 9A, the landing gear 20 is retained with the holding portion 15 (step S21).

First, the supporting portion 171 of the bracket 17 is disposed below the jacking-up portion 28 of the strut 21, and the hoisting boom 13 is raised with the hydraulic pump 133, whereby the jacking-up portion 28 is supported by the supporting portion 171. By causing the bracket 17 to swing as necessary, it is possible to align the supporting portion 171 with the position of the jacking-up portion 28.

After making the bracket 17 support the landing gear 20, the strut 21 is fixed to the bracket 17 with the fixture 18 (see FIG. 4). Afterward, the landing gear 20 is detached from the crane.

Then, the landing gear 20 is carried in below the main wing with the dolly 10, and the dolly 10 is made standstill beneath the attachment portion of the main wing to which the landing gear 20 is attached (step S22). At this point, it is desirable to access below the main wing from a tail side in order to avoid interference with a jack to support the airframe, an engine, or the like.

Figure 9B:
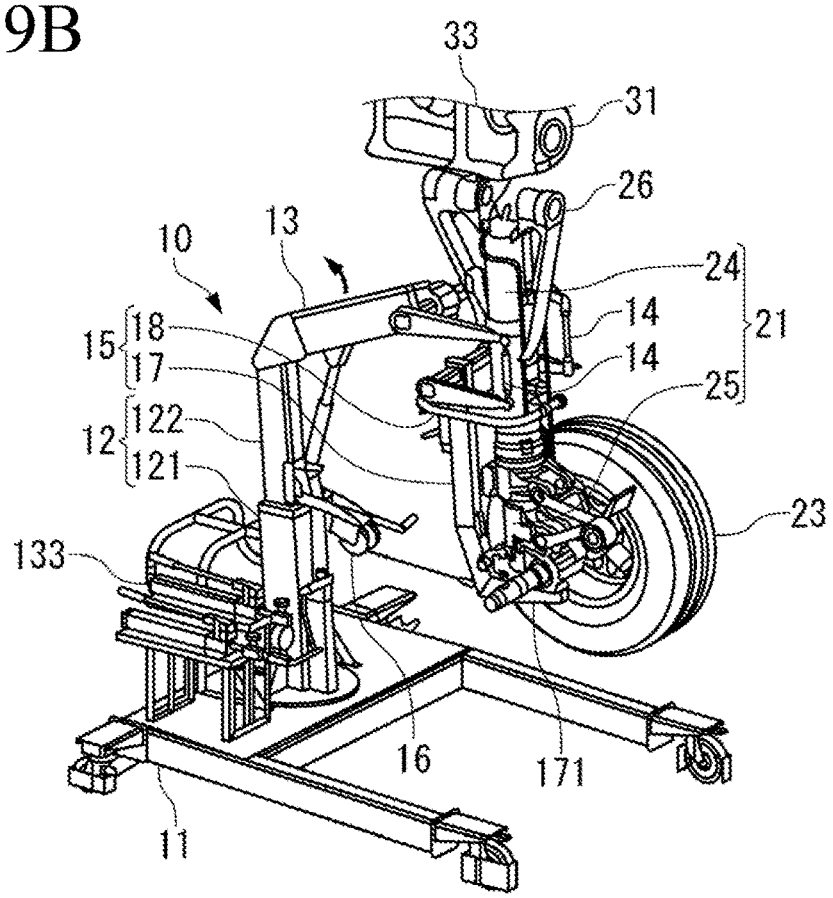

Below the main wing, first, as illustrated in FIG. 9B, the hoisting boom 13 is raised with the hydraulic pump 133, the landing gear 20 is caused to ascend up to near the attachment portion of the main wing (step S23).

At this point, the coupled portion 26 of the strut 21 is moved up to a position that makes it possible to aim at the attachment portion of the main wing.

It is preferable during the movement of the landing gear 20 to keep the attitude of the landing gear 20 almost along the vertical direction by operating the winch 16.

Subsequently, by operating the winch 16, the inclination angle of the landing gear 20 is controlled so as to insert the coupled portion 26 of the strut 21 into between the coupling planes 310 and 320 of structure members of the main wing (see FIG. 3) in a direction orthogonal to the rotational movement axis A (step S24). That is, the angle of the strut 21 is controlled so as to incline with respect to the vertical direction by θ°.

At this time point, the coupled portion 26 is isolated from the attachment portion of the main wing, making a space in the vertical direction, which allows work of the angle adjustment to be performed smoothly.

The angle adjustment of the strut 21 is performed with the fixture 18 and the winch 16.

Figure 10A:
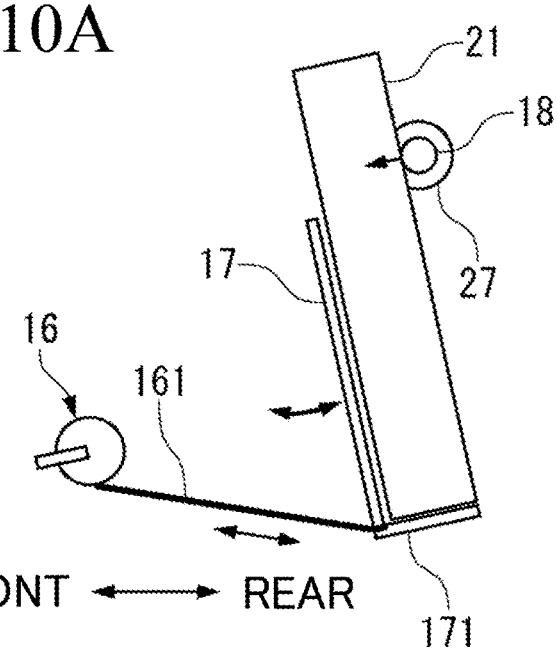
FIG. 10A and FIG. 10B are drawings illustrating a process of attaching the landing gear to the airframe.

As schematically illustrated in FIG. 10A, the fixture 18 is fixed to the lug 27 of the strut 21 supported by the bracket 17, giving the strut 21 inclination. Since the strut 21 is supported by the fixture 18 that is fixed to the lug 27 rearward of the center of gravity of the landing gear 20 (rearward of the center of gravity of the strut 21), which makes the strut 21 incline in a direction illustrated in FIG. 10A. The lug 27 used to moor the landing gear 20 to the ground with the wire rope has a sufficient rigidity and strength for a load applied from the fixture 18.

By pulling forward a lower portion of the bracket 17 retaining the strut 21 in this state with the winch 16, it is possible to control the inclination angle of the strut 21 to a desired angle (θ°).

Figure 10B:
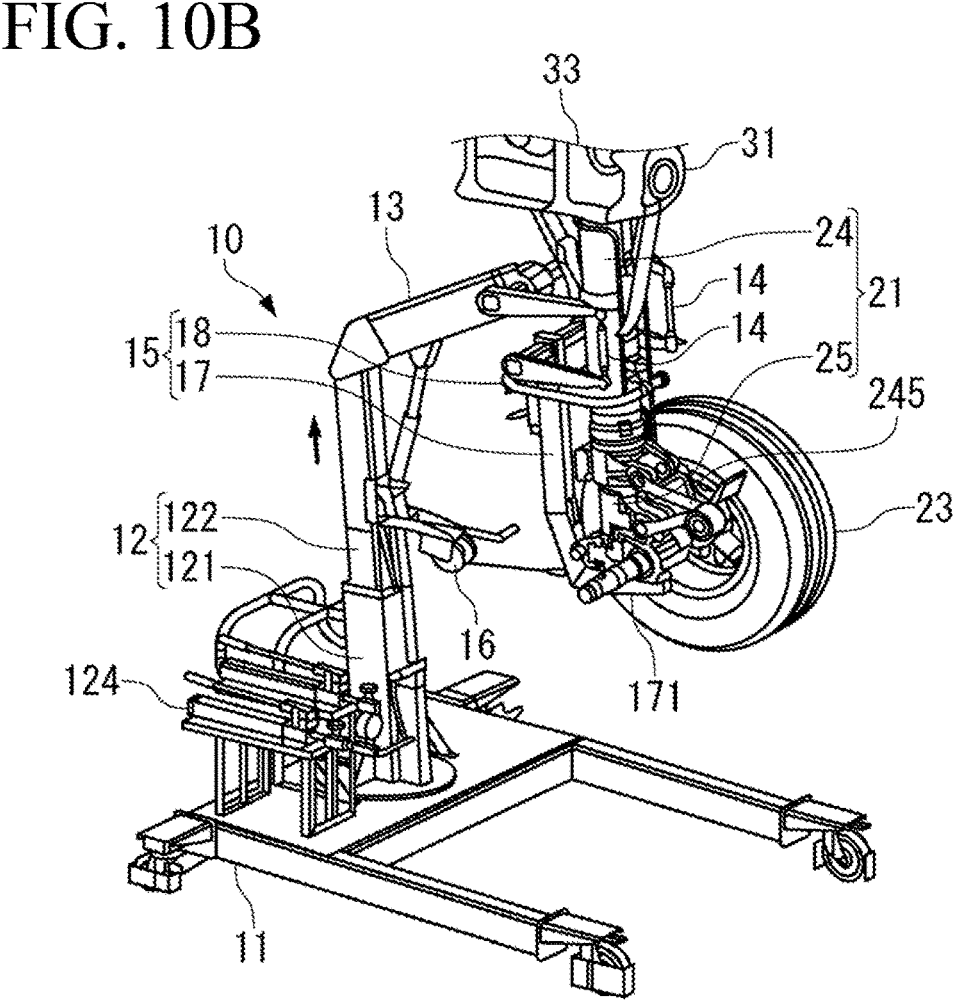

Next, as illustrated in FIG. 10B, the expandable boom 12 is caused to expand (step S25). Then, the landing gear 20 ascends with its inclination angle kept, and the coupled portion 26 of the strut 21 is inserted into between the coupling planes 310 and 320, as illustrated in FIG. 3. As the positions of the holes of the coupled portion 26 and the structure members 31 and 32 are aligned, the coupling pins 30 and 30 are inserted into the holes to couple the strut 21 and the structure members 31 and 32 of the main wing (step S26).

In order to protect the strut 21 and the structure members 31 and 32 of the main wing approaching each other in the coupling work, a resin sheet or the like can be used.

In the present embodiment, in order to secure a working space used to insert the coupling pins 30 and 30 from rearward of the coupled portion 26, the dolly 10 is configured to dispose the expandable boom 12 and the hoisting boom 13 on the front side of the landing gear 20, and to dispose the holding portion 15 on the front side of the landing gear 20. In this configuration, the strut link 245 is positioned on the rear side of the expandable boom 12, the hoisting boom 13, and the bracket 17, which makes the strut link 245 hard to interfere with these booms 12 and 13, and the like.

Afterward, there is performed work of confirming that the strut 21 being compressed normally expands (step S27).

When the fixture 18 is detached, and then the expandable boom 12 is caused to contract to cause the strut 21 to expand, the inner strut 25 is drawn out from the outer strut 24.

Furthermore, after the hoisting boom 13 is lowered, and it is confirmed that the strut 21 has expanded to the maximum position, the dolly 10 is carried away forward, with the strut 21 left (step S28).

In such a manner, the attachment work of the landing gear 20 is completed.

The detachment procedure (see FIG. 5) and the attachment procedure (FIG. 8) that have been described previously, are merely an example. Parts of the procedures may be modified as appropriate. At the time of moving the landing gear 20 in the vertical direction, any one of the expandable boom 12 and the hoisting boom 13 may be used in an appropriate order.

(5) Advantageous Effects of the Present Embodiment

According to the dolly 10 and the method of attaching and detaching the landing gear 20 using the dolly 10 in the present embodiment described above, the expandable boom 12 and the hoisting boom 13 are employed as a mechanism to move the landing gear 20, and the landing gear 20 is suspended with these booms 12 and 13, which have the following advantages.

First, with the stroke St1 of the expandable boom 12 in which the inner barrel 122 is inserted into the inside of the outer barrel 121, and the stroke St2 corresponding to the rotational movement range of the hoisting boom 13, it is possible to suppress the height of the dolly 10 when the booms 12 and 13 are lowered, while securing the stroke in the vertical direction necessary for the attachment and detachment. When the dolly 10 has a low height, there is a low risk of that the dolly 10 interferes with the airframe in handling the landing gear 20.

Next, unlike a case of displacing an object via a reduction gear train, it is possible with the expandable boom 12 and the hoisting boom 13 to move the landing gear 20 quickly with the hydraulic actuators 123 and 132. In addition, since the hoisting boom 13 can provide a large amount of movement, it is possible to cause the landing gear 20 to ascend up to near the attachment portion of the airframe in a short time. This can offer enough time for work of adjusting the inclination angle of the strut 21 and of causing the expandable boom 12 to expand to make the coupled portion 26 reach the attachment portion of the airframe, allowing for proceeding with the work carefully.

Moreover, since the holding portion 15 and the landing gear 20 being suspended are allowed to swing, it is possible to easily perform fine adjustment of the attitude of the landing gear 20 to a desired direction so as to position the attachment portion of the airframe and the coupled portion 26. Unlike a case of using an assembly including a multi-axial position adjustment mechanism built therein, there is no need of positioning work with high precision, which requires skill.

The positioning mechanism that is implemented by including the booms 12 and 13 and by being suspended by them does not require such a high rigidity that is required for a configuration in which an assembly rigidly fixed to the landing gear 20 is moved together with the landing gear 20. For this reason, it is possible to provide the dolly 10 that is small and lightweight.

In addition, according to the present embodiment, since the expandable boom 12 inclines at the same angle as that of the strut 21 of the landing gear 20, only by causing the expandable boom 12 to expand, it is possible to move the landing gear 20 toward the attachment portion of the airframe simply and reliably while keeping the angle of the landing gear 20. In contrast to this, with the multi-axial position adjustment mechanism, when the strut 21 inclines with respect to the vertical direction, there is a need of position adjustment in at least two axes.

Figure 11:
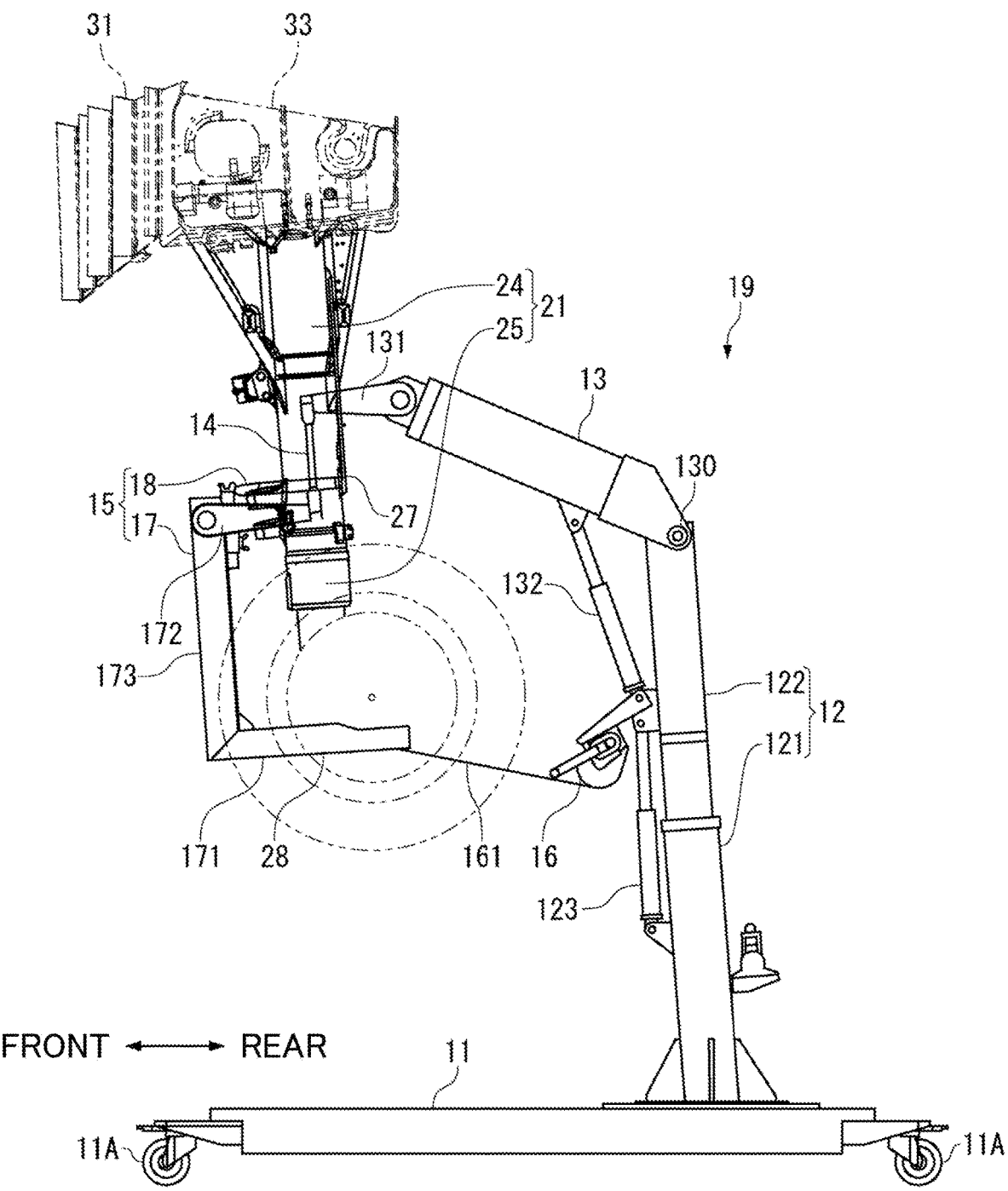
FIG. 11 is a side view illustrating a dolly according to a modification of the present invention.

As long as the dolly includes the expandable boom 12 and the hoisting boom 13, and the holding portion 15 is suspended on the hoisting boom 13, the dolly can be configured appropriately, which is illustrated in FIG. 11 as another example.

The expandable boom 12 and the hoisting boom 13 of a dolly 19 illustrated in FIG. 11 are disposed on the rear side of the landing gear 20, and the holding portion 15 is disposed on the front side of the landing gear 20. The arm 131 included in the hoisting boom 13 and the arm 172 included in the holding portion 15 are connected by the link rods 14.

Also, this dolly 19 can be used for the attachment or detachment of the landing gear 20 in which the strut 21 inclines with respect to the vertical direction, as with the dolly 10 previously described.

[Dolly for Handling Nose Gear]

Figure 12:
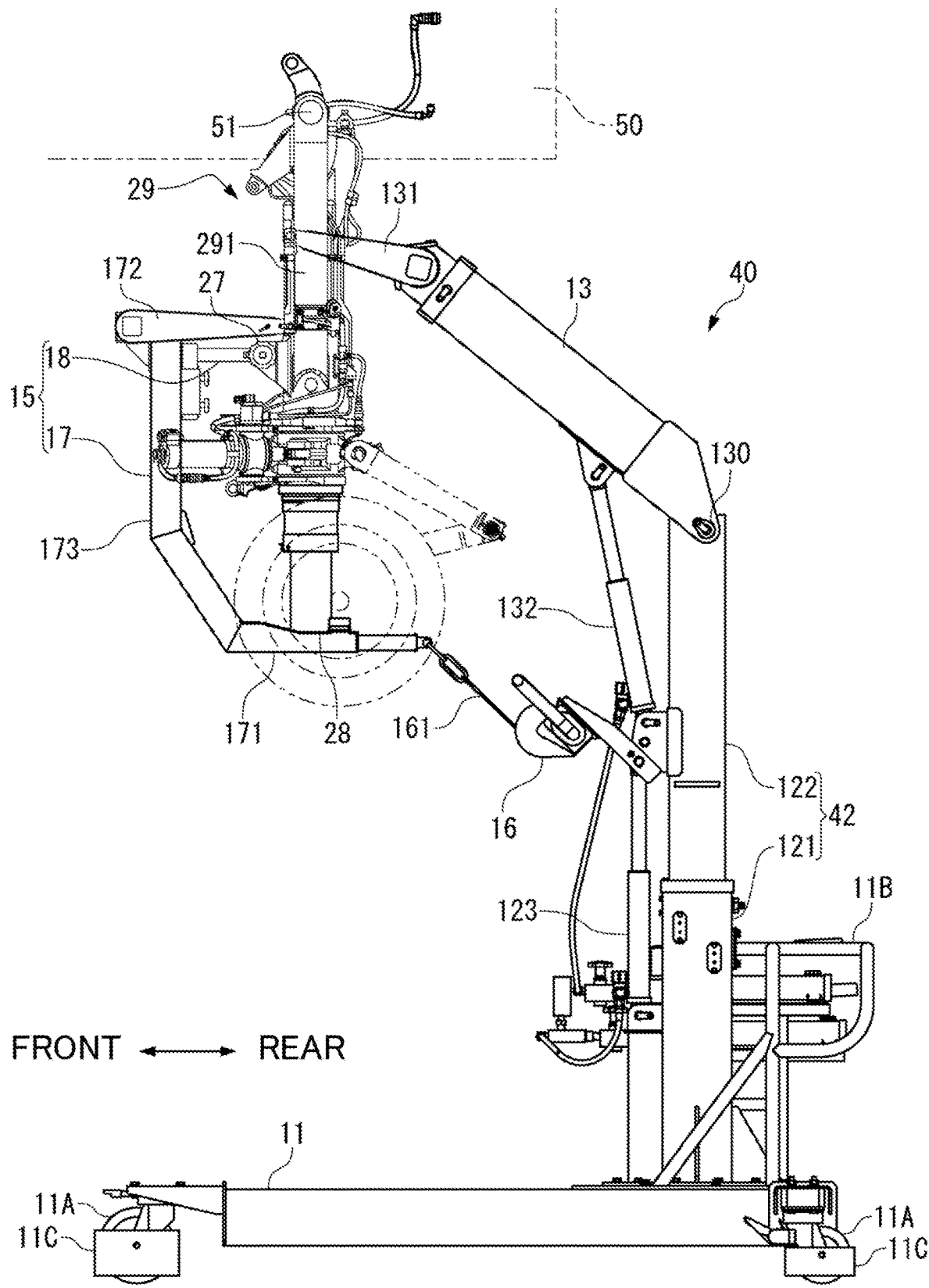
FIG. 12 is a drawing illustrating a landing gear (nose gear) of an aircraft and a dolly.

FIG. 12 illustrates a dolly 40 used for handling a landing gear 29 as a nose gear. The axis line of a strut 291 of the landing gear 29 extends in the vertical direction. The strut 291 is coupled to a structure member 50 that is provided in the inside of an airframe, in such a manner as to rotationally movable about an axis being a coupling pin 51 that runs along a lateral direction (direction orthogonal to the paper of FIG. 12).

As with the strut 291, an expandable boom 42 of the dolly 40 also extends in the vertical direction. Except for this regard and the structure of a portion where the holding portion 15 is suspended on the hoisting boom 13, the dolly 40 is configured as with the dolly 10 previously described.

For this reason, it is possible with the dolly 40 to detach or attach the landing gear 29 from or to an airframe in the same manner as the detachment procedure (see FIG. 5) or the attachment procedure (see FIG. 8) previously described.

Here, if the axis line of the landing gear 29 is parallel to the vertical direction when the landing gear 29 is caused to ascend up to near an attachment portion of the airframe with the hoisting boom 13 (step S23), the landing gear 29 may be caused to ascend vertically without performing the angle adjustment of the landing gear 29 (step S24).

In accordance with the levelness of the floor, or for example, the assembly tolerance of a member or the like of the dolly 40, fine adjustment can be performed on the angle of the landing gear 29 to position the landing gear 29 with respect to the attachment portion of the airframe.

In addition, in the final phase of the positioning to position the positions of holes into which the coupling pin 51 is to be inserted, it is also allowed to correct the attitude of the landing gear 29 by operating the winch 16 or pushing the bracket 17 or the strut 21 manually as necessary.

Besides the above, the configuration described in the above embodiment may be selected or changed to the other configurations as appropriate, without departing from the gist and scope of the present invention.

For example, it is allowed to couple the link rods 14 and the hoisting arm 131, and the link rods 14 and the arm 172 of the holding portion 15, with pins that run orthogonal to the paper of FIG. 2. In such a manner, it is possible to cause the holding portion 15 and the landing gear 20 to swing in a direction about the axis of the pin. In addition, even with pin-coupling, it is also allowed for the link rods 14 to swing in the lateral direction (direction orthogonal to the paper of FIG. 2) and the like with respect to the front-rear direction, which enables the fine adjustment of the angle of the landing gear 20 in any direction.

In addition, as long as the holding portion 15 is suspended on the hoisting boom 13, the holding portion 15 and the landing gear 20 retained by the holding portion 15 are allowed to swing, and thus it is possible to configure the dolly of the present invention without including the link rods 14.

What is claimed is:

1. A dolly for handling a landing gear of an aircraft, the dolly comprising:
    a base;
    an expandable member that rises from the base and is configured to be expandable and contractible;
    a hoisting member that is interconnected to the expandable member in a raisable and lowerable manner; and
    a holding portion that is suspended on the hoisting member and retains the landing gear, wherein the holding portion comprises:
        a bracket that supports the landing gear, the bracket comprising an interconnecting portion, a pair of arms connected to a first, distal end of the interconnecting portion, the pair of arms configured to sandwich a strut of the landing gear, and a supporting portion extending from the interconnecting portion such that the supporting portion is positioned beneath the pair of arms;
        a fixture that is secured to the interconnecting portion at a position disposed vertically between the pair of arms and the supporting portion, the fixture being configured to attach to the landing gear to give the landing gear an inclination with respect to a vertical direction that is normal to a surface on which the dolly sits, wherein the fixture includes a first end that is fixed to the interconnecting portion, and a second end that is fixed to the strut; and
        a winch that pulls the bracket to control an attitude of the landing gear.

2. The dolly for handling a landing gear of an aircraft according to claim 1, wherein the expandable member is configured to incline with respect to the vertical direction.

3. The dolly for handling a landing gear of an aircraft according to claim 1, wherein the expandable member is configured to expand and contract in parallel to an axis line of the strut of the landing gear.

4. The dolly for handling a landing gear of an aircraft according to claim 1, wherein the holding portion is suspended on the hoisting member via a rod.

5. The dolly for handling a landing gear of an aircraft according to claim 1, wherein the interconnecting portion interconnects the supporting portion and the pair of arms on a front side of the strut.

6. The dolly for handling a landing gear of an aircraft according to claim 1, wherein the bracket is formed in a substantially C shape in side view.

7. The dolly for handling a landing gear of an aircraft according to claim 1, wherein the fixture has a C shape as a whole when viewed in the vertical direction.

8. The dolly for handling a landing gear of an aircraft according to claim 1, wherein the dolly further includes a link rod that interconnects the holding portion and the hoisting member, and the holding portion is suspended from the hoisting member via the link rod in a swingable manner.

9. The dolly for handling a landing gear of an aircraft according to claim 1, wherein a wire rope of the winch ties the expandable member and the holding portion together.

10. The dolly for handling a landing gear of an aircraft according to claim 1, wherein the expandable member is driven by a first hydraulic actuator, and the hoisting member is driven by a second hydraulic actuator.

11. A method for attaching the landing gear to an airframe using the dolly according to claim 1, the method comprising:
    a first step of causing the holding portion to retain the landing gear;
    a second step of causing the landing gear to ascend toward an attachment portion of the airframe with the hoisting member;
    a third step of causing the expandable member to expand; and
    a fourth step of coupling the landing gear and the attachment portion of the airframe.

12. A method for detaching the landing gear from an airframe using the dolly according to claim 1, the method comprising:
- a first step of causing the holding portion to retain the landing gear;
- a second step of releasing a coupling between the landing gear and an attachment portion of the airframe;
- a third step of causing the expandable member to contract; and
- a fourth step of causing the landing gear to descend with the hoisting member.

13. The dolly for handling a landing gear of an aircraft according to claim 2, wherein the expandable member is configured to expand and contract in parallel to an axis line of a strut of the landing gear.

14. A method for attaching the landing gear to an airframe using the dolly according to claim 1, the method comprising:
- a first step of causing the holding portion to retain the landing gear;
- a second step of causing the landing gear to ascend toward an attachment portion of the airframe with the hoisting member;
- a third step of causing the expandable member to expand; and
- a fourth step of coupling the landing gear and the attachment portion of the airframe.

15. A method for detaching the landing gear from an airframe using the dolly according to claim 1, the method comprising:
- a first step of causing the holding portion to retain the landing gear;
- a second step of releasing a coupling between the landing gear and an attachment portion of the airframe;
- a third step of causing the expandable member to contract; and
- a fourth step of causing the landing gear to descend with the hoisting member.

16. The dolly for handling a landing gear of an aircraft according to claim 1, wherein a wire rope of the winch is attached to the interconnecting portion.

17. The dolly for handling a landing gear of an aircraft according to claim 1, wherein the pair of arms of the bracket are suspended from the hoisting member by respective link rods, and wherein each link rod has a spherical bearing such that the bracket is swingable.

* * * * *